United States Patent
Raybaud et al.

(10) Patent No.: US 7,867,464 B2
(45) Date of Patent: Jan. 11, 2011

(54) PROCESS FOR THE STORAGE OF HYDROGEN USING A SYSTEM THAT STRIKES A BALANCE BETWEEN AN ALLOY OF ALKALINE METAL AND SILICON AND THE CORRESPONDING HYDRIDE

(75) Inventors: Pascal Raybaud, Rueil Malmaison (FR); François Ropital, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 0 days.

(21) Appl. No.: 12/480,257

(22) Filed: Jun. 8, 2009

(65) Prior Publication Data

US 2009/0302270 A1  Dec. 10, 2009

Related U.S. Application Data

(63) Continuation of application No. 11/347,576, filed on Feb. 6, 2006, now abandoned.

(30) Foreign Application Priority Data

Feb. 7, 2005 (FR) .................................. 05/01.231

(51) Int. Cl.
 *C01B 33/32* (2006.01)
 *H01M 4/88* (2006.01)
(52) U.S. Cl. ....................... 423/332; 432/347; 432/646; 502/102
(58) Field of Classification Search ........................ None
See application file for complete search history.

(56) References Cited

U.S. PATENT DOCUMENTS

| | | | |
|---|---|---|---|
| 4,893,756 A | 1/1990 | Fetcenko et al. | |
| 6,514,478 B2 * | 2/2003 | Zaluska et al. | 423/644 |
| 6,726,892 B1 | 4/2004 | Au | |
| 7,144,620 B2 * | 12/2006 | Todd | 428/212 |
| 2009/0129992 A1 * | 5/2009 | Mills | 422/112 |

FOREIGN PATENT DOCUMENTS

| | | |
|---|---|---|
| EP | 0360203 A | 3/1990 |
| WO | 2004057070 A | 7/2004 |

OTHER PUBLICATIONS

Pacios, L.F. et al. "Structures and Bonding in Silane Derivatives With One Alkali Atom" (Journal of Physical Chemistry) 2000, 7617-7624, 104 (32).
Hagenmiller Paul et al. "Sur Quelques Reactions du Monosilane Avec le Sodium Metallique" (Mémoires Présentés a la Société Chimique) Jun. 1964, 1187-1191, 6.
Moc, Jerzy et al. "Structures and Energies of the Lithiated Silanes" (Journal of the Chemical Society) Jan. 18, 1988, 131-135.
"Castep" Accelrys, Material's Studio, San Diego, CA.

* cited by examiner

*Primary Examiner*—Melvin C Mayes
*Assistant Examiner*—Sheng H Davis
(74) *Attorney, Agent, or Firm*—Millen, White, Zelano & Branigan, P.C.

(57) ABSTRACT

A process for the reversible storage of hydrogen, comprising bringing an alloy of alkaline metal and silicon into contact with gaseous hydrogen leading to the formation of the hydride or corresponding hydrides, comprises the use of at least one balanced system that corresponds to the formula:

$$M_{X_M}Si \Leftrightarrow M_{X_M}SiH_n$$

where M is selected from among Li, Na, or K and in which atomic ratios $X_M$ take on the following values:

$$X_{Li}=1$$

$$1 \leq X_{Na} \leq 3$$

$$1 \leq X_K \leq 2$$

n is the number of hydrogen atoms corresponding to the stoichiometry of the hydride or formed hydrides.
or to the formula $$MSi_{X_{Si}} \Leftrightarrow MSi_{X_{Si}}H_{2X_{Si}+1}$$

where M is selected from among Li, Na, or K and in which the atomic ratio $X_{Si}$=Si/M takes on a value of 1 to 4.

13 Claims, 4 Drawing Sheets

[Key to Fig. 2:]

Pression = Pressure

[Key to Figs. 3 and 4:]

Intensité = Intensity

Taille = Size

[Key to Figs. 5 and 6:]

Pression = Pressure

[Key to Fig. 7:]

Pression = Pressure

PROCESS FOR THE STORAGE OF HYDROGEN USING A SYSTEM THAT STRIKES A BALANCE BETWEEN AN ALLOY OF ALKALINE METAL AND SILICON AND THE CORRESPONDING HYDRIDE

This application is a continuation of U.S. patent application Ser. No. 11/347,576, filed, Feb. 6, 2006, now abandoned which claims the priority of French Application No. 05/01.231, filed on Feb. 7, 2005.

FIELD OF THE INVENTION

This invention relates to a process for reversible storage of hydrogen using new materials that are potentially advantageous for the storage of hydrogen.

PRIOR ART

Within the context of research of new energy systems, the development of processes for storage and transport of hydrogen is very important. Compounds with a lithium base that are used for storing hydrogen are known. Due to an excessive stability of the lithium hydride that makes it difficult to store hydrogen, it is necessary to use more complex lithium hydrides.

Document U.S. Pat. No. 6,514,478 B2 describes Li—Be—H-type hydrides. In a very general way, Patent Application WO 2004/05070 A2 describes the use of anisotropic nanostructures such as, for example, lithium nitride, able to be used in devices for storing hydrogen.

Object of the Invention

This invention relates to a process for reversible storage of hydrogen using new materials that are potentially advantageous for the storage of hydrogen (theoretically more than 5% by mass) under the following conditions, defined by the pressure-temperature isothermal plateau:

270 K<T<370 K and 1<P<10 atm (or about 0.1 MPa<P<about 10 MPa).

These new materials comprise a balanced system that is formed between an alloy of alkaline metal and silicon and hydride or the corresponding hydrides; they are of the type:

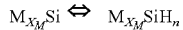

where M is selected from among Li, Na, or K and in which the atomic ratios $X_M$ take on the following values:

$X_{Li}=1$ $1 \leq X_{Na} \leq 3$ $1 \leq X_K \leq 2$ n is the number of hydrogen atoms corresponding to the stoichiometry of the hydride or formed hydrides.

If the alloy that is formed between the alkaline metal and silicon is superstoichiometric, i.e., if the ratio $X_{Si}$ that is defined by Si/M takes on values of from 1 to 4, the balanced system that is used is as follows:

$MSi_{X_{Si}} \Leftrightarrow MSi_{X_{Si}}H_{2X_{Si}+1}$

The new materials that are used from the hydrogen storage process are more particularly of the type:

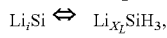

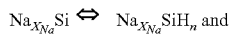

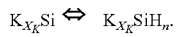

n is the number of stoichiometric hydrogen atoms of the hydride or hydrides that are formed.

Atomic ratios $X_M$ take on the following values:

$X_{Li}=1$ $1 \leq X_{Na} \leq 3$ $1 \leq X_K \leq 2$.

The invention also relates to new structures that correspond to formulas $NaSiH_3$ and $LiSiH_3$.

DETAILED DESCRIPTION OF THE INVENTION

Figure 1:
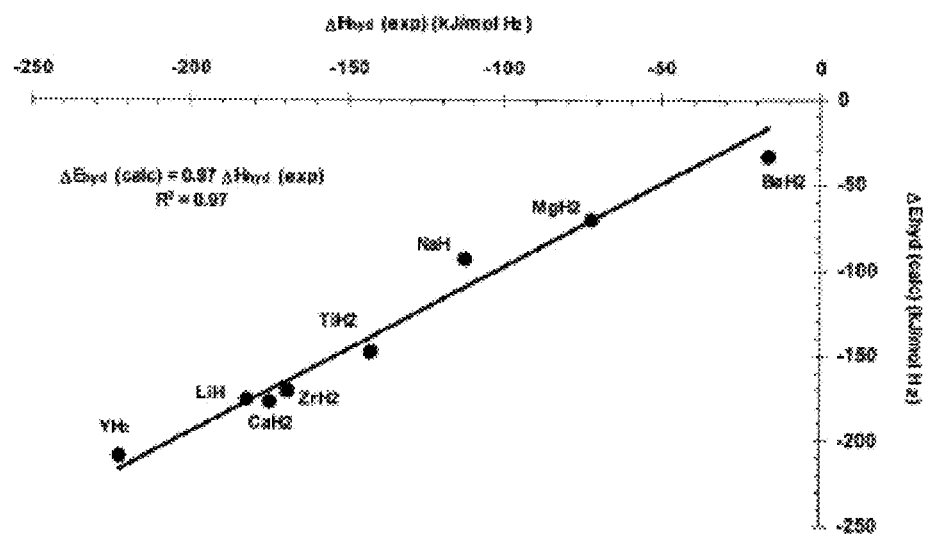
FIG. 1 plots the values of $\Delta E_{hyd}$ that are calculated and the experimental values $\Delta H_{hyd}$ of the literature.

In the storage process according to the invention, the alloys of alkaline metal and silicon are brought into contact with gaseous hydrogen and thus lead to the formation of (a) corresponding hydride compound(s) (hydrogen absorption). By slightly increasing the temperature or slightly reducing the hydrogen pressure, the formed hydride restores the hydrogen (desorption). It is therefore a reversible storage process.

The hydrides at equilibrium with the alloys KSi, NaSi or LiSi or with the elements K, Li or Na and Si have improved thermodynamic properties for the storage of hydrogen.

The $KSiH_3$ structure is known, whereas the $NaSiH_3$ and $LiSiH_3$ structures are not inventoried in the ICSD and CRYSMET crystallographic bases, to which we have access. The $NaSiH_3$ and $LiSiH_3$ structures will therefore be resolved analogously to the $KSiH_3$ structure by the method of calculation that is described below.

The ICSD (Inorganic Crystal Structure Database) base is the property of the "Fachinformationszentrum Karlsruhe [Technical Information Center of Karlsruhe] (FIZ)" in Germany and the "National Institute of Standards and Technology (NIST)" in the U.S.A.

The CRYSMET base belongs to and is maintained by "Toth Information Systems,"Ottawa, and le Conseil national de recherches [National Research Council] of Canada.

(ICSD and CRYSMET can be accessed within the MedeA interface marketed by Materials Design S.a.r.l., Le Mans (France)).

Many useful properties of a solid material can be derived directly from determining its chemical cohesion energy. This cohesion energy is intrinsically based on the chemical composition, the local atomic structure of the material, its electronic properties and all the physical properties that are derived therefrom. Quantum physics and more specifically the density functional theory (whose abbreviation DFT is obtained from the English "Density Functional Theory") provide a reliable base for the quantitative prediction of structural, electronic and thermodynamic properties of an atomic, molecular or crystalline structure before any attempt at synthesis of the laboratory material (see: W. Kohn, L. J. Sham, Phys. Rev. A 140, 1133 (1965)). In particular, the formalism of the DFT, as it is implemented in many current quantum software applications, such as:

- the "Vienna Ab initio Simulation Package" (VASP) (see: G. Kresse, J. Hafner, Phys. Rev. B 48 (1993) 13115; G. Kresse, J. Furthmüller, Phys. Rev. B 6 (1996) 15; as well as the address URL: http://www.cms.mpi.univie.ac.at/vasp/; references [1]);
- "CASTEP" (see: http://www.tcm.phy.cam.ac.uk/castep/), and
- "Gaussian" (see: http://www.gaussian.com), has as a central object the determination of the electronic wave function of a material that is simulated by an approximate solution to the famous Schrödinger equation. Access to the wave function makes possible the development of a predictive and quantitative methodology of the chemical bond in an atomic, molecular or crystalline structure.

In the search for new materials for the storage of hydrogen, the experimenters need to rely on the knowledge and a methodology of the chemistry of the solid. On the basis of thermodynamic concepts such as the formation enthalpy, the relative stabilities of the structures of materials can be quantified based on temperature and pressure conditions. The modern techniques of quantum calculation such as the DFT offer the advantage of relying on a minimal knowledge of empirical data for determining these same thermodynamic properties. Thanks to the knowledge of basic constants of physics, these techniques, thus often called "ab initio," therefore make it possible to predict the energy stability and the physico-chemical properties of a crystalline structure defined by its composition and its crystallographic mesh, independently of any experimental approach. Moreover, these techniques make it possible to eliminate experimental uncertainties on the structure of a material.

The use of intermetallic hydrides as materials for storing hydrogen is based on the following chemical equilibrium:

$$\frac{2}{n}M + H_2 \to \frac{2}{n}MH_n \qquad (1)$$

where M represents the stable metallic phase being transformed into the stoichiometric hydride phase $MH_n$.

This hydride phase has a theoretical mass storage capacity that is equal to nMH/(nMH+MM)×100%, where MH is the molar mass of atomic hydrogen and MM is that of metal.

The thermodynamic characteristics of transformation (1) are described by a pressure-temperature isotherm. When the two hydride and metal phases co-exist, the isotherm has a plateau. Temperature T and equilibrium pressure $P_{eq}$ of the plateau are determined by the Van't Hoff equation:

$$\frac{2}{n}\ln\left(\frac{P_{eq}}{P^0}\right) = \frac{\Delta H_{hyd}}{RT} - \frac{\Delta S_{hyd}}{R} \qquad (2)$$

where:

$\Delta H_{hyd}$ (or $\Delta S_{hyd}$) represents the enthalpy variation (or the entropy variation) of transformation (1);

$R=8.314510$ J.mol$^{-1}$.K$^{-1}$ is the molar constant of the ideal gases, and $P^0=1$ bar is the standard pressure (or 0.1 MPa).

This approach can be generalized for hydrides of metal alloys, $AB_x$, in the following way:

$$\frac{2}{n}AB_x + H_2 \to \frac{2}{n}AB_xH_n \qquad (3)$$

where A and B are two metal elements and x is the atomic ratio B/A in the alloy.

It is commonly recognized that the primary contribution according to the terms of entropic variation $\Delta S_{hyd}$ is the loss of entropy of the hydrogen molecule that passes from the gas phase in an adsorbed state into the solid state of the final hydride. The value of $\Delta S_{hyd}$ is known for being close to 130 J.K$^{-1}$.mol$^{-1}$ of $H_2$, regardless of the hydride (see: "Hydrogen-Storage Materials for Mobile Applications," L. Schlapbach, A. Züttel, Nature 414 (2001) 353-358, reference [5]; and "Hydrogen Storage Properties of Mg Ultrafine Particles Prepared by Hydrogen Plasma-Metal Reaction," H. Shao, Y. Wang, H. Xu, X. Li, Materials Science Engineering B 110 (2004) 221-226, reference [6]). Below, we retained this value. According to equation (2), also valid for reaction (3), the logarithm of the pressure at equilibrium, $P_{eq}$, varies linearly with the inverse of temperature T. The slope of the linear relationship is determined by $\Delta H_{hyd}$. In the following examples, we will show, thanks to the Van't Hoff diagrams, the variations of the logarithm of $P_{eq}$ based on 1/T (more specifically 1000/T for reasons of providing units). Such diagrams make it possible to identify potentially advantageous materials for storing hydrogen in a targeted range of $P_{eq}$ and T.

Consequently, the prediction (by a reliable theoretical approach) is of major interest for the knowledge of temperature and pressure conditions in which the metal or alloy can be transformed into hydride. As $\Delta H_{hyd}$ is in general exothermic (for the stable hydrides), the slope is negative. The value of $\Delta H_{hyd}$ closely depends on the stability of the hydride relative to the metallic phase or to the alloy: the more thermodynamically stable the hydride, the more reaction (1) or (3) is exothermic.

The formation enthalpy of the hydride, $\Delta H_{hyd}$, can be expressed based on the internal energy variation during hydrogenation, $\Delta E_{hyd}$:

$$\Delta E_{hyd} = E_{AB_xH_n} - E_{AB_x} - E_{H_2} \qquad (4)$$

where E represents the internal energy of the hydride phases, metal, and the hydrogen molecule in gaseous phase. The internal energy of the material is linked to interactions between the atomic centers that constitute the material and the electrons. This energy is also often called electronic energy and is directly connected to the cohesion energy of the material. The expression of $\Delta H_{hyd}$ based on $\Delta E_{hyd}$ is as follows:

$$\Delta H_{hyd} = \Delta E_{hyd} + P\Delta V + \Delta ZPE + T\Delta c_p \qquad (5)$$

where $\Delta c_p$ represents the calorific capacity variation between the hydride phase and the metal phase, $\Delta ZPE$ is the energy variation at the zero point between the hydride phase and the metal phase, and $\Delta V$ is the variation of molar volume between the hydride phase and the metal phase.

The modern techniques for quantum simulation make it possible to calculate systematically the values of $E_{AB_xH_n}$, $E_{AB_x}$, and $E_{H_2}$, and therefore to derive therefrom the value of $\Delta E_{hyd}$. For a given crystalline phase (known or unknown in an experimental way), the initial crystallographic structure is determined by the space group, the parameters of the primitive cell, and the atomic positions in the mesh of the primitive cell. For existing structures, the bases of crystallographic data, such as ICSD and CRYSMET, provide this information.

For the new structures (unknown or not totally resolved experimentally), the same standard description will be adopted in this invention. We will also add the simulation of the X-ray diffraction spectrum (DRX), commonly used experimentally for characterizing the observed structures.

For any structure (known or new), the process of rigorous simulation is adopted so as to determine the so-called basic state of the structure, i.e., the stable state of the structure. In this basic state, the values of $E_{AB_xH_n}$, $E_{AB_x}$, $E_{H_2}$, and $\Delta E_{hyd}$ are calculated. This process makes it possible in particular to determine the electronic wave function of the system by optimizing the crystalline structure for the hydride and metal solids and the hydrogen molecule, thanks to modern quantum simulation techniques at the DFT level, accessible in software such as VASP (see references [1] above). For this purpose, the following criteria are imposed during the calculation:

- the criterion of convergence of the electronic energy should be set at 0.01 kJ/mol of primitive cell,
- the criterion of convergence of the atomic positions and the volume of the primitive cell of the solid should lead to an energy precision of 0.1 kJ per mol of primitive cell,
- the grid of points-k used to describe the Brillouin zone should be large enough to ensure a fluctuation of the electronic energy that is weaker than 0.01 kJ per mol of cell,
- the size of the plane-wave base that is used or the precision of the base that is used should ensure a convergence of the electronic energy of more than 0.1 kJ per mol of primitive cell.

For the applications of storage of on-board hydrogen, an equilibrium temperature of close to 300 K ($1000/T \# 3.3$ $K^{-1}$) is generally sought for a pressure that is close to 1 atm (about 0.1 MPa). Due to equation (2), this corresponds to a value of $\Delta H_{hyd}$ that is close to −39 kJ per mol of hydrogen. For this invention, and because of the precision of the simulation approach defined above, we will designate materials that are potentially advantageous for storing hydrogen, all the materials whose isothermal plateau verifies the following conditions:

$$270 < T < 370 \text{ K (or } 2.7 < 100/T < 3.7 \text{ K}^{-1})$$

and $$1 < P_{eq} < 10 \text{ atm (or about 0.1 MPa} < P_{eq} < \text{about 10 MPa)} \quad (6).$$

The target window that embodies this domain will be shown in all the Van't Hoff diagrams in the following examples.

According to the invention, the alkaline metal that is selected can be of "mixed" type, in which lithium, sodium and potassium can be substituted respectively by sodium and/or potassium, lithium and/or potassium and lithium and/or sodium.

According to the invention, the alloy can also comprise, in a proportion of less than 5% by weight, at least one light transition metal of groups 3 to 12 of the periodic table selected from among, for example, Sc, Ti, V, Cr, Mn, Fe, Co, Ni, Cu and Zn.

The alloy of alkaline metal and silicon of the invention can come in solid or in dispersed form, obtained by, for example, grinding.

The process is applied to, for example, the storage of on-board, stationary or portable hydrogen.

Figure 3:
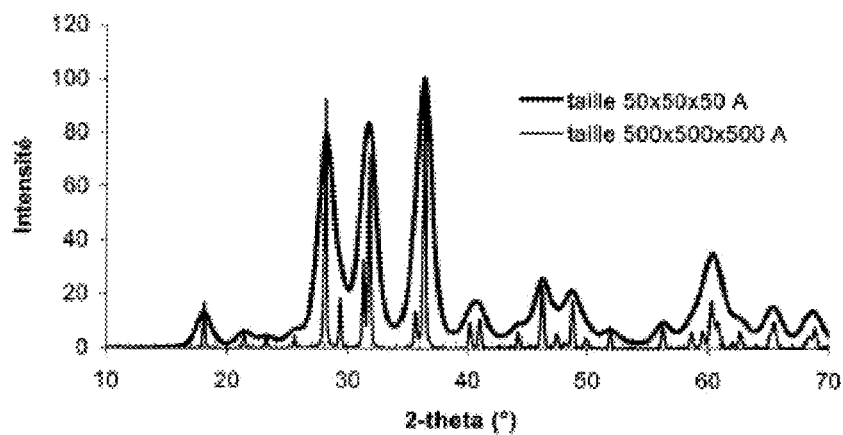
FIG. 3 is the X-ray diffraction spectrum of the $NaSiH_3$ crystalline structure.
Figure 4:
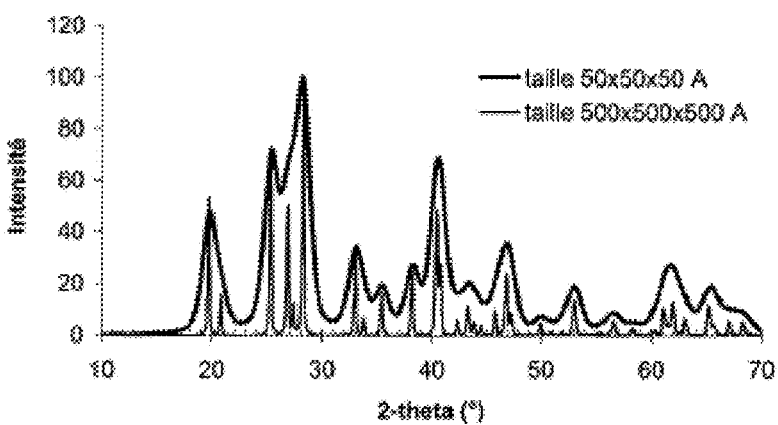
FIG. 4 is the X-ray diffraction spectrum of the $LiSiH_3$ crystalline structure.

The invention also relates to new structures that correspond to formulas $NaSiH_3$ and $LiSiH_3$, whose X-diffraction spectra are provided respectively in FIGS. 3 and 4.

EXAMPLES

Among the following examples, Example 1 is provided by way of comparison, and Example 2 illustrates the invention.

Example 1 (For Comparison)

Known Cases of Simple Hydrides

The diagram of FIG. 1 plots the values of $\Delta E_{hyd}$ that are calculated according to the process that is described above and the experimental values $\Delta H_{hyd}$ of the literature (see: "CRC Handbook of Chemistry and Physics," 76$^{th}$ Edition 1995-1996, David R. Lide Editor-in-Chief, CRC Press).

The crystallographic structures that are used are those of hydride and metal phases that are stable under conditions that are close to those set forth above in (6). They are recorded in Table 1.

TABLE 1

Simulated Structural Properties and Mass Capacity of Simple Hydrides.

| Hydride | Crystallographic Reference | Space Group | % by Mass | Balance Equation |
|---|---|---|---|---|
| LiH | ICSD.61751 | FM3-M | 22.37 | $2Li + H_2 \rightarrow 2LiH$ |
| NaH | ICSD.33670 | FM3-M | 8.00 | $2Na + H_2 \rightarrow 2NaH$ |
| $BeH_2$ | ICSD.84231 | IBAM | 18.17 | $Be + H_2 \rightarrow BeH_2$ |
| $MgH_2$ | ICSD.26624 | P42/MNM | 7.60 | $Mg + H_2 \rightarrow MgH_2$ |
| $CaH_2$ | ICSD.23870 | PNMA | 4.75 | $Ca + H_2 \rightarrow CaH_2$ |
| $YH_2$ | CRYSMET.36093 | Fm-3m | 2.20 | $Y + H_2 \rightarrow YH_2$ |
| $TiH_2$ | CRYSMET.38081 | Fm-3m | 4.01 | $Ti + H_2 \rightarrow TiH_2$ |
| $ZrH_2$ | CRYSMET.39242 | I4/mmm | 2.15 | $Zr + H_2 \rightarrow ZrH_2$ |

The result of FIG. 1 shows that there is a linear relationship between the two basic values—experimental $\Delta_{hyd}$ and calculated $\Delta E_{hyd}$—on a broad range of representative hydrides. These examples also show that the calculated value $\Delta E_{hyd}$ is a good thermodynamic descriptor for predicting thermodynamic properties of materials for the purpose of storing hydrogen. The final precision on the energy is on the order of 3 to 5%, which is in agreement with the method of calculation used and the process described above. This result implies that the contributions that are linked to terms $\Delta c_p$, $\Delta ZPE$ and $\Delta V$ are negligible compared to the contributions of cohesion energies.

Figure 2:
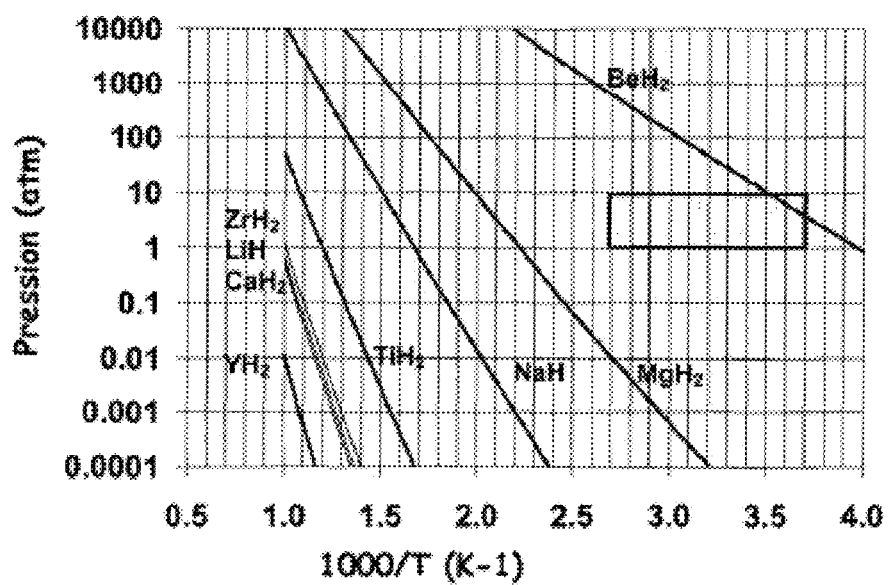
FIG. 2 is the Van't Hoff diagram of simple hydrides using the calculated values of $\Delta E_{hyd}$.

FIG. 2 represents the translation of these values to the Van't Hoff diagram by using the calculated values of $\Delta E_{hyd}$. As is known experimentally, none of the simple hydrides of Table 1 (except for $BeH_2$, which exhibits other difficulties of operation) makes it possible to come close to the target window that is defined above, which makes it possible to consider the use of these materials for storing hydrogen.

For example, the case of magnesium hydride, which is used as a reference to the following, reveals that $\Delta H_{hyd}(MgH_2)$ is equal to −75.0 kJ per mol of $H_2$ (see references [2] and [3] above). The calculation provides a very close value, on the order of −70.2 kJ per mol of $H_2$. The equilibrium temperature at atmospheric pressure is 575 K experimentally (see reference [2]), which is much too high to be usable.

Example 2

Cases of Silicon Hydrides

A new family of materials that are based on silicon is potentially advantageous for storing hydrogen: $KSiH_3$, $LiSiH_3$ and $NaSiH_3$. They develop a high mass storage capacity (see Table 2). Only the $KSiH_3$ phase is inventoried in the database ICSD No. 65954 with space group PNMA. For the $NaSiH_3$ and $LiSiH_3$ phases, the structure of prototype $KSiH_3$ is retained (see Table 2).

TABLE 2

Structures of Silicon-Potassium, Silicon-Lithium and Silicon-Sodium Hydrides

| Formula | Crystallographic Reference | Space Group | % by Mass |
|---|---|---|---|
| $KSiH_3$ | CRYSMET.65954 | PNMA | 4.27 |
| $LiSiH_3$ | CRYSMET.65954 Prototype $KSiH_3$ | PNMA | 7.89 |
| $NaSiH_3$ | CRYSMET.65954 Prototype $KSiH_3$ | PNMA | 5.55 |

The X-diffraction spectra of the two new structures $NaSiH_3$ and $LiSiH_3$ are provided in FIGS. 3 and 4 respectively.

TABLE 3

Definition of the $NaSiH_3$ Structure Space Group PNMA

| Parameters of the Monoclinical Cell Element | a = 8.29396 α = 90.00 X | b = 4.93395 β = 90.00 Y | c = 6.08397 γ = 90.00 Z |
|---|---|---|---|
| Na (4c) | 0.16982 | 0.25000 | 0.16436 |
| Si (4c) | 0.05798 | 0.25000 | −0.34777 |
| H (4c) | −0.11812 | 0.25000 | −0.26924 |
| H (8d) | 0.10891 | 0.47835 | −0.18539 |

TABLE 4

Description of the Simulated $LiSiH_3$ Structure Space Group PNMA

| Parameters of the Monoclinical Cell Element | a = 8.53326 α = 90.00 X | b = 4.71238 β = 90.00 Y | c = 5.30609 γ = 90.00 Z |
|---|---|---|---|
| Li (4c) | 0.17456 | 0.25000 | 0.15957 |
| Si (4c) | 0.08540 | 0.25000 | −0.35280 |
| H (4c) | −0.06323 | 0.25000 | −0.19195 |
| H (8d) | 0.16563 | 0.48443 | −0.19051 |

The chemical balances considered and the calculated values of $\Delta E_{hyd}$ for the different materials are as follows:

$2/3K + 2/3Si + H_2 \rightarrow 2/3KSiH_3 \quad \Delta E_{hyd} = -55.3 \text{ kJ/mol}$ (a)

$2/3KSi + H_2 \rightarrow 2/3KSiH_3 \quad \Delta E_{hyd} = -45.5 \text{ kJ/mol } (x_K = 1)$ $2/3Li + 2/3Si + H_2 \rightarrow 2/3LiSiH_3 \quad \Delta E_{hyd} = -34.8 \text{ kJ/mol}$ (b)

$2/3LiSi + H_2 \rightarrow 2/3LiSiH_3 \quad \Delta E_{hyd} = -7.3 \text{ kJ/mol } (x_{Li} = 1)$ $2/3Na + 2/3Si + H_2 \rightarrow 2/3NaSiH_3 \quad \Delta E_{hyd} = -36.2 \text{ kJ/mol}$ (c)

$2/3NaSi + H_2 \rightarrow 2/3NaSiH_3 \quad \Delta E_{hyd} = -31.9 \text{ kJ/mol } (x_{Na} = 1)$ These balances can be expressed in the following general way by assuming a variable composition of $M/Si = x_M$ (with $x_M \geq 1$):

$2/(2+x_M)MSi + 2(x_M-1)/(2+x_M)M + H_2 \rightarrow 2/(2+x_M) MSiH_3 + 2(x_M)MH$ In the case of a superstoichiometric material of Si ($x_{Si} = Si/M$ encompassed between 1 and 4), the balance can be expressed in the following manner:

$2/(2x_{Si}+1)MSi + 2(x_{Si}-1)/(2x_{Si}+1)Si + H_2 \rightarrow 2/(2x_{Si}+1) MSi_{x_{Si}}H_{2x_{Si}+1}$ This equilibrium involves the formation of a single hydride compound of the di-, tri- or tetra-silyl type of alkaline metals (M=Li, Na, K).

The KSi, LiSi and NaSi alloy phases are the structures that are identified in the CRYSMET base and provided in Table 5.

TABLE 5

Structures of Silicon Alloys Considered

| Formula | Crystallographic Reference | Space Group |
|---|---|---|
| KSi | CRYSMET.84809 | P-43n |
| LiSi | CRYSMET.102320 | I41/a |
| NaSi | CRYSMET.80184 | C2/c |

Figure 5:
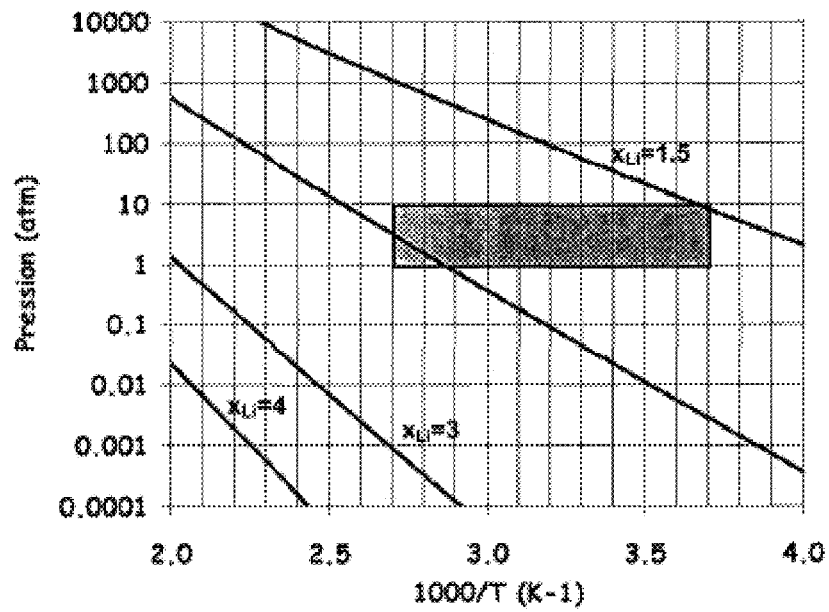
FIG. 5 is the Van't Hoff diagram for alloys of lithium and silicon.
Figure 6:
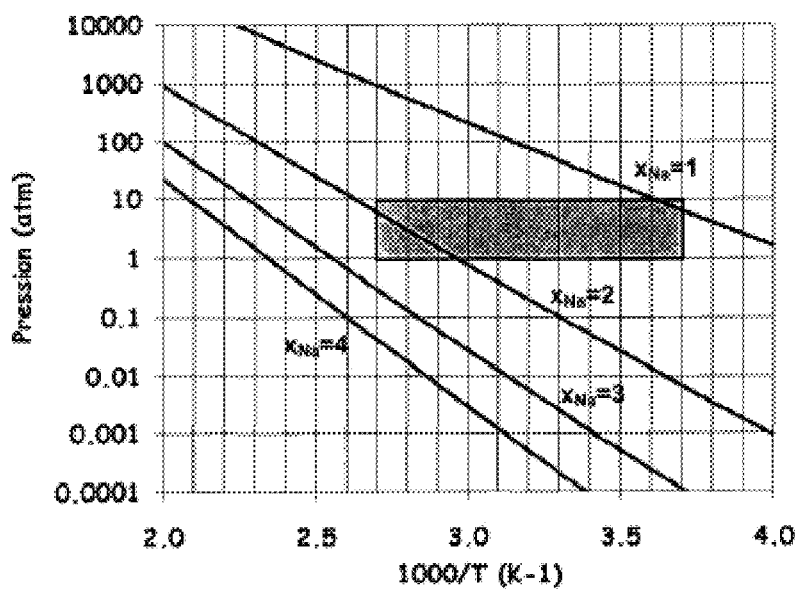
FIG. 6 is the Van't Hoff diagram for the alloys of sodium and silicon.
Figure 7:
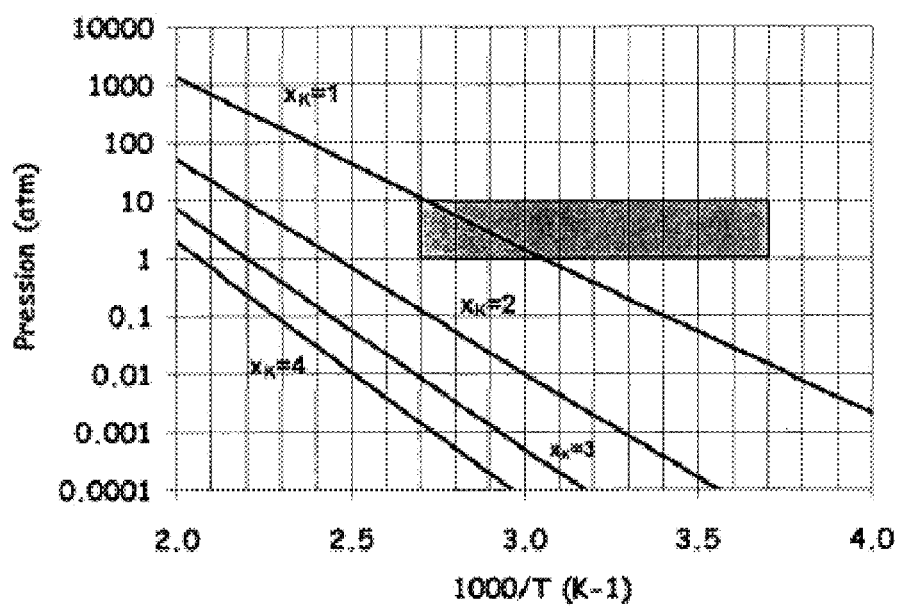
FIG. 7 is the Van't Hoff diagram for the alloys of potassium and silicon.

The Van't Hoff diagrams that correspond to various preceding equilibria and for various elements are provided in FIGS. 5, 6 and 7 for the elements Li, Na and K, respectively. These diagrams show that the hydrides that contain silicon in the presence of lithium, sodium or potassium are likely to be advantageous materials with a high mass capacity for storing hydrogen under favorable thermodynamic conditions.

Table 6 below indicates the mass contents and hydrogenation enthalpy based on $x_M$ as defined by the preceding chemical balances:

TABLE 6

| | $x_M$ | % by Mass | $\Delta E_{hyd}$ (kJ/mol) |
|---|---|---|---|
| $Li_{x_{Li}}Si$ | 1 | 7.89 | −7.3 |
| | 2 | 8.70 | −49.3 |
| | 3 | 9.27 | −74.4 |
| | 4 | 9.70 | −91.2 |
| $Na_{x_{Na}}Si$ | 1 | 5.55 | −31.9 |
| | 2 | 5.12 | −47.3 |
| | 3 | 4.90 | −56.5 |
| | 4 | 4.76 | −62.7 |
| $K_{x_K}Si$ | 1 | 4.27 | −45.52 |
| | 2 | 3.63 | −59.26 |
| | 3 | 3.32 | −67.51 |
| | 4 | 3.15 | −73.01 |

The invention claimed is:

1. A process for reversible storage of hydrogen comprising bringing into contact an alloy of a potassium and silicon, KSi having a crystallographic reference CRYSMET 84809 and a space group P-43n with gaseous hydrogen, under the conditions of 270K<T<370 K and 1<P<10 atm, leading to the formation of a crystalline hydride KsiH3 having a crystallographic reference CRYSMET 65954, under a balanced system corresponding to the formula:

$2/3 KSi + H_2 < \text{- - -} > 2/3 KSiH_3$.

2. A process for reversible storage of hydrogen comprising bringing into contact an alloy of potassium and silicon, KSi having a crystallographic reference CRYSMET 84809 and a space group P-43n with gaseous hydrogen, under the conditions of 270K<T<370K and 1<P<10 atm, leading to the formation of a crystalline hydride KsiH3 having a crystallographic reference CRYSMET 65954, under a balanced system corresponding to the formula:

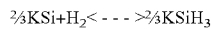
$\tfrac{2}{3}KSi + H_2 \mathrel{<\text{- - -}>} \tfrac{2}{3}KSiH_3$ wherein the potassium is partially substituted by sodium.

3. A process according to claim 1, wherein the alloy also comprises, in a proportion that is less than 5% by weight, at least one light transition metal of groups 3 to 12 of the periodic table selected from among Sc, Ti, V, Cr, Mn, Fe, Co, Ni, Cu and Zn.

4. A process according to claim 1, wherein the alloy of potassium metal and silicon is in solid form.

5. A process according to claim 1, wherein the alloy of potassium metal and silicon is in a dispersed form.

6. A process according to claim 1, wherein the alloy of potassium metal and silicon is obtained by grinding.

7. A process according to claim 1, applied to the storage of on-board hydrogen.

8. A process according to claim 1, applied to stationary storage.

9. A process according to claim 1, applied to portable storage.

10. A process according to claim 2, wherein the alloy also comprises, in a proportion that is less than 5% by weight, at least one light transition metal of groups 3 to 12 of the periodic table selected from among Sc, Ti, V, Cr, Mn, Fe, Co, Ni, Cu and Zn.

11. A process according to claim 2, applied to the storage of on-board hydrogen.

12. A process according to claim 2, applied to stationary storage.

13. A process according to claim 2, applied to portable storage.

* * * * *